(12) United States Patent
Cordwell

(10) Patent No.: US 7,824,483 B2
(45) Date of Patent: Nov. 2, 2010

(54) COLORANT COMPOSITION, INK, PRINTING PROCESS

(75) Inventor: Janette Cordwell, Blackley (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 12/602,514

(22) PCT Filed: Jun. 10, 2008

(86) PCT No.: PCT/GB2008/001967

§ 371 (c)(1),
(2), (4) Date: Dec. 1, 2009

(87) PCT Pub. No.: WO2008/155517

PCT Pub. Date: Dec. 24, 2008

(65) Prior Publication Data

US 2010/0189966 A1    Jul. 29, 2010

(30) Foreign Application Priority Data

Jun. 21, 2007    (GB) ................ 0711963.9

(51) Int. Cl.
*C09D 11/02* (2006.01)
*C09B 67/00* (2006.01)

(52) U.S. Cl. ............... 106/31.48; 106/31.52; 8/639; 8/641

(58) Field of Classification Search ......... 106/31.48, 106/31.52; 8/639, 641; 347/100; 428/195.1
See application file for complete search history.

(56) References Cited

U.S. PATENT DOCUMENTS

| | | | | |
|---|---|---|---|---|
| 5,015,292 | A * | 5/1991 | Bruder et al. | 106/31.48 |
| 5,023,324 | A * | 6/1991 | Moser | 534/606 |
| 6,488,752 | B1 | 12/2002 | Kenworthy et al. | 106/31.48 |
| 7,208,033 | B2 * | 4/2007 | Kawabe et al. | 106/31.48 |
| 7,211,132 | B2 * | 5/2007 | Oki et al. | 106/31.52 |
| 7,244,299 | B2 * | 7/2007 | Tsuji et al. | 106/31.48 |
| 7,520,927 | B2 * | 4/2009 | Yamakami et al. | 106/31.47 |
| 2004/0123772 | A1 * | 7/2004 | Zimmer et al. | 106/31.48 |

FOREIGN PATENT DOCUMENTS

| | | |
|---|---|---|
| GB | 2 263 912 | 8/1993 |
| JP | 2005 126525 | 5/2005 |
| JP | 2005 298803 | 10/2005 |
| WO | WO 99/43754 | 9/1999 |
| WO | WO 01/22127 | 3/2001 |

* cited by examiner

*Primary Examiner*—Helene Klemanski
(74) *Attorney, Agent, or Firm*—Morgan Lewis & Bockius LLP

(57) ABSTRACT

A composition comprising a compound of Formula (1) or a salt thereof and compound of Formula (2) or a salt thereof:

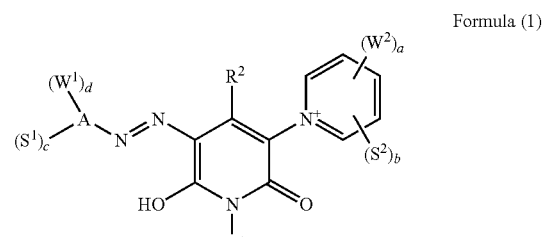

Formula (1)

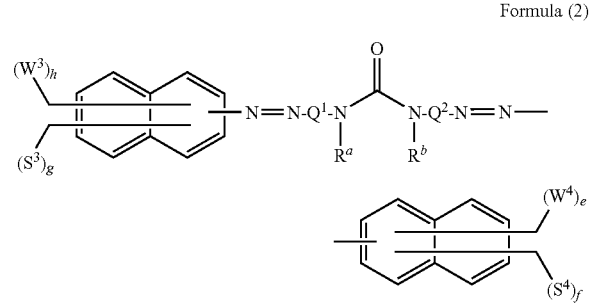

Formula (2)

wherein:
A is or comprises an aryl or heteroaryl group;
$Q^1$ and $Q^2$ each independently is an optionally substituted phenylene group;
$R^1$, $R^2$, $R^a$ and $R^b$ each independently is H, optionally substituted alkyl, optionally substituted aryl or optionally substituted arylalkyl;
each $W^1$, $W^2$, $W^3$ and $W^4$ independently is a $-CO_2H$, $-SO_3H$, $-PO_3H_2$ group or an alkyl substituted with one or more groups selected from $-CO_2H$, $-SO_3H$, $-PO_3H_2$;
each $S^1$, $S^2$, $S^3$ and $S^4$ independently is a substituent other than those defined for $W^1$, $W^2$, $W^3$ and $W^4$;
a and d each independently is from 1 to 5;
b and c each independently is from 0 to 4;
(a+b) has a value of from 1 to 5;
(c+d) has a value of from 1 to 5;
e and h each independently is from 1 to 7;
f and g each independently is from 0 to 6;
(e+f) has a value of from 1 to 7; and
(g+h) has a value of from 1 to 7.

15 Claims, No Drawings

COLORANT COMPOSITION, INK, PRINTING PROCESS

This is a 371 filing based on PCT/GB2008/001967 filed Jun. 10, 2008 and claiming priority from Great Britain Application No. 0711963.9, filed Jun. 21, 2007.

This invention relates to colorant compositions (especially, but not exclusively yellow colorant compositions), to inks containing said colorant compositions and to the use of said inks in ink jet printing ("IJP").

Ink jet printing is a non-impact printing technique in which droplets of ink are ejected through fine nozzles onto a substrate without bringing the nozzle into contact with the substrate.

There are many demanding performance requirements for colorants and inks used in IJP. For example, they desirably provide sharp, non-feathered images having good water-fastness, light-fastness, ozone-fastness and optical density. The inks are often required to dry quickly when applied to a substrate to prevent smudging, but they should not form a crust over the tip of an ink jet nozzle because this will tend to reduce print quality and in extreme cases may prevent the printer from printing. The inks are preferably also stable to storage over time without decomposing or forming a precipitate which could block the fine nozzle.

U.S. Pat. No. 6,488,752 discloses several azo containing compounds for use in ink jet printing.

For colorants used in ink jet printing inks it is often difficult to simultaneously achieve good chroma, hue, light-fastness and ozone-fastness. Also, it is desirable to provide good performance properties using economically efficient technologies. A further desirable property is that prints should not significantly change hue or colour when stored, exposed to light or when exposed to ozone. For example, a yellow print should preferably stay yellow in colour when exposed to sunlight rather than change to a more red or blue shade.

The present invention aims to address, at least in part, one or more of the abovementioned desirable technical goals.

According to a first aspect of the present invention there is provided a composition comprising a compound of Formula (1) or a salt thereof and compound of Formula (2) or a salt thereof:

wherein:
A is or comprises an aryl or heteroaryl group;
$Q^1$ and $Q^2$ each independently is an optionally substituted phenylene group;
$R^1$, $R^2$, $R^a$ and $R^b$ each independently is H, optionally substituted alkyl, optionally substituted aryl or optionally substituted arylalkyl;
each $W^1$, $W^2$, $W^3$ and $W^4$ independently is a $-CO_2H$, $-SO_3H$, $-PO_3H_2$ group or an alkyl substituted with one or more groups selected from $-CO_2H$, $-SO_3H$, $-PO_3H_2$;
each $S^1$, $S^2$, $S^3$ and $S^4$ independently is a substituent other than those defined for $W^1$, $W^2$, $W^3$ and $W^4$;
a and d each independently is from 1 to 5;
b and c each independently is from 0 to 4;
(a+b) has a value of from 1 to 5;
(c+d) has a value of from 1 to 5;
e and h each independently is from 1 to 7;
f and g each independently is from 0 to 6;
(e+f) has a value of from 1 to 7; and
(g+h) has a value of from 1 to 7.

In Formula (1), b and c are preferably each independently 0, 1 or 2, more preferably 0 or 1.

In Formula (1) a and d are preferably each independently 1, 2, or 3, more preferably 1 or 2.

Preferably (a+b) has a value of 1, 2 or 3, more preferably 1 or 2. Preferably (c+d) has a value of 1, 2 or 3, more preferably 2 or 3.

The compound of Formula (1) or a salt thereof is preferably a mono azo compound (i.e. containing only one azo ($-N=N-$) group).

In one embodiment A is an aryl group, more preferably a naphthyl or phenyl group and especially a phenyl group.

In another embodiment A is an indanyl group, more preferably A is an indanyl group of the Formula (1a):

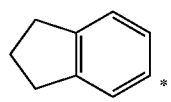

Formula (1a)

wherein the asterisk represents the point of attachment to the azo group in the compound of Formula (1).

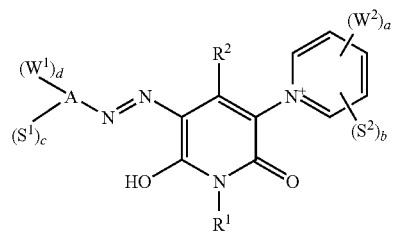

Formula (1)

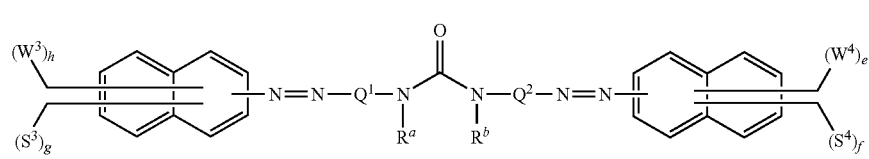

Formula (2)

Preferably each $W^1$ and each $W^2$ independently is —$CO_2H$, —$SO_3H$, —$PO_3H_2$ or $C_{1-10}$alkyl (more preferably $C_{1-6}$-alkyl) substituted by one, two or three (more preferably one) groups selected from —$CO_2H$, —$SO_3H$, and —$PO_3H_2$.

More preferably each $W^1$ and each $W^2$ independently is —$CO_2H$, —$SO_3H$ or $C_{1-6}$-alkyl substituted by —$CO_2H$ or —$SO_3H$.

It is especially preferred that each $W^1$ independently is —$CO_2H$ or —$SO_3H$.

It is especially preferred that each $W^2$ is —$CO_2H$.

Preferably at least one $W^1$ is attached in an ortho position relative to the azo group (—N═N—).

Preferably $S^1$ and $S^2$ are each independently optionally substituted aryl, optionally substituted aralkyl, halogen (especially F and Cl), nitro, cyano, —$CF_3$, —$OR^3$, —$NR^4R^5$, —$SR^6$, —$C(O)R^7$, —$C(O)OR^8$, —$SO_2R^9$, —$SOR^{10}$, alkyl optionally substituted by a group other than —$SO_3H$, —$CO_2H$ or —$PO_3H_2$ or a group of Formula (1b):

wherein:
$R^3$ and $R^6$ each independently is H, optionally substituted alkyl or optionally substituted aryl;
$R^4$ and $R^5$ each independently is H, optionally substituted alkyl, optionally substituted aryl, —$CO(C_{1-6}$-alkyl), —$CONH_2$, or $R^4$ and $R^5$ together with the nitrogen to which they are attached form a 5- or 6-membered ring;
$R^7$, $R^8$, $R^9$ and $R^{10}$ each independently is optionally substituted alkyl or optionally substituted aryl;

the group of Formula (1b) is:

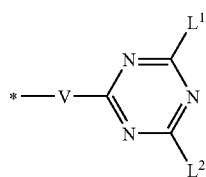

Formula (1b)

wherein
$L^1$ and $L^2$ each independently is —$OR^{11}$, —$SR^{12}$ or —$NR^{13}R^{14}$;
$R^{11}$ and $R^{12}$ each independently is H, optionally substituted aryl or optionally substituted alkyl; and
$R^{13}$ and $R^{14}$ each independently is H, optionally substituted aryl, optionally substituted alkyl, —$CO(C_{1-6}$-alkyl), —$CONH_2$ or $R^{13}$ and $R^{14}$ together with the nitrogen to which they are attached form an optionally substituted morpholine or piperazine ring;
V is —$N(R^{15})$— or —S—;
$R^{15}$ is H, optionally substituted alkyl or optionally substituted aryl; and the asterisk (*) represents the point of attachment to the group represented by A.

In a preferred embodiment $S^1$ and $S^2$ are each independently optionally substituted aryl, optionally substituted aralkyl, halogen (especially F and Cl), nitro, cyano, —$CF_3$, —$OR^3$, —$NR^4R^5$, —$SR^6$, —$C(O)R^7$, —$C(O)OR^8$, —$SO_2R^9$, —$SOR^{10}$ or alkyl optionally substituted by a group other than —$SO_3H$, —$CO_2H$ or —$PO_3H_2$; wherein $R^3$, $R^4$, $R^5$, $R^6$ $R^7$, $R^8$, $R^9$ and $R^{10}$ are as hereinbefore defined.

Preferably $R^7$, $R^8$, $R^9$ and $R^{10}$ are each independently optionally substituted alkyl.

When any of $S^1$ and $S^2$ is optionally substituted alkyl it is preferably optionally substituted $C_{1-10}$-alkyl, more preferably $C_{1-6}$-alkyl optionally substituted by —OH, nitro, cyano, halogen (especially F or Cl), amino, —$NH(C_{1-4}$-hydroxyalkyl) or —$NH(C_{1-4}$-alkyl).

When any one of $R^3$, $R^4$, $R^5$, $R^6$, $R^7$, $R^8$, $R^9$, $R^{10}$, $R^{11}$, $R^{12}$, $R^{13}$, $R^{14}$ and $R^{15}$ is optionally substituted alkyl it is preferably optionally substituted $C_{1-10}$-alkyl, more preferably optionally substituted $C_{1-6}$-alkyl. Preferred optional substituents are —OH, nitro, cyano, amino and halogen (preferably F or Cl), more especially Cl and —OH.

When one any of $R^3$, $R^4$, $R^5$, $R^6$, $R^7$, $R^8$, $R^9$, $R^{10}$, $R^{11}$, $R^{12}$, $R^{13}$, $R^{14}$ and $R^{15}$ is optionally substituted aryl it is preferably optionally substituted phenyl or optionally substituted naphthyl, especially optionally substituted phenyl. Preferred optional substituents are $C_{1-4}$-alkoxy, ($C_{1-4}$-hydroxyalkoxy)-$C_{1-4}$-alkoxy-, —OH, —$CO_2H$, —$SO_3H$, —$CF_3$, amino, —$NH(C_{1-4}$-alkyl), —$NH(C_{1-4}$-hydroxyalkyl), —NH(—CO($C_{1-4}$-alkyl)), halogen (especially F or Cl), nitro, —$CO(C_{1-4}$-alkyl), —$SO_2(C_{1-4}$alkyl) and $C_{1-4}$-alkyl optionally substituted by —OH, —$CO_2H$ and —$SO_3H$.

When $R^4$ and $R^5$ together with the nitrogen to which they are attached form a 5 or 6 membered ring, the ring is preferably optionally substituted morpholine or optionally substituted piperazine.

Preferred optional substituents on the rings which may be formed by $R^4$ and $R^5$, and $R^{13}$ and $R^{14}$, together with the nitrogen to which they are attached are selected from —OH, —$CO_2H$, —$SO_3H$, $O_{1-4}$-alkoxy and $C_{1-4}$-alkyl optionally substituted by —OH, —$CO_2H$ or —$SO_3H$.

$R^7$, $R^8$, $R^9$ and $R^{10}$ are preferably each independently $C_{1-4}$-alkyl, more preferably methyl or ethyl.

When any one of $S^1$ and $S^2$ is aralkyl it is preferably optionally substituted phenyl-(alkylene)- or optionally substituted naphthyl-(alkylene)-, more preferably optionally substituted phenyl-($C_{1-6}$-alkylene)- or optionally substituted naphthyl-($C_{1-6}$-alkylene)-. Preferred optional substituents on the aralkyl groups are those listed above for the aryl groups, more preferably $C_{1-4}$-alkyl, $C_{1-4}$-alkoxy, —$SO_3H$, —$CO_2H$, amino, nitro, F or Cl.

Preferably each $S^1$ and each $S^2$ is has no —$CO_2H$, —$SO_3H$ and —$PO_3H_2$ groups.

Preferably each $S^1$ and $S^2$ independently is $C_{1-4}$-alkyl or $C_{1-4}$ alkoxy.

Preferably, c is from 0 to 3, more preferably c is 0.

Preferably, b is from 0 to 3, more preferably b is 0.

Preferably $R^1$ is H, optionally substituted $C_{1-10}$-alkyl, optionally substituted phenyl or optionally substituted phenyl-($C_{1-6}$-alkylene)-, more preferably H, phenyl, $C_{1-6}$-alkyl optionally substituted by —OH, —$SO_3H$ or —$CO_2H$, especially H or $C_{1-4}$-alkyl, more especially H.

Preferably $R^2$ is optionally substituted $C_{1-10}$-alkyl, optionally substituted phenyl, more preferably phenyl, or $C_{1-6}$-alkyl optionally substituted by —OH, —$CO_2H$ or —$SO_3H$, especially $C_{1-4}$-alkyl, more especially methyl or ethyl. Most preferably $R^2$ is methyl.

In a preferred compound of Formula (1) or salt thereof:
A is as hereinbefore defined;
each $W^1$ and each $W^2$ independently is —$CO_2H$, —$SO_3H$ or a $C_{1-6}$ alkyl substituted by —$CO_2H$ or —$SO_3H$;
each $S^1$ and $S^2$ independently is $C_{1-6}$ alkyl, phenyl, nitro, halo (especially F and Cl), cyano, —$CF_3$, —$NH_2$, $C_{1-6}$ alkoxy, —$SC_{1-6}$ alkyl, —$C_{1-6}$ alkyl substituted by —OH or —NHC(O)$C_{1-6}$ alkyl;
$R^1$ is H or $C_{1-6}$-alkyl optionally substituted by —OH, —$SO_3H$ or —$CO_2H$;
$R^2$ is $C_{1-4}$ alkyl;
a and d each independently is 1 or 2;
b and c each independently is 0, 1 or 2.

Preferably, $W^2$ is —$CO_2H$.
Preferably, each $W^1$ independently is —$CO_2H$ or $SO_3H$.
Preferably, $R^1$ is H or $C_{1-4}$ alkyl, more preferably H.
Preferably, $R^2$ is methyl or ethyl, more preferably methyl.
It is especially preferred that a is 1 and $W^2$ is —$CO_2H$ which is attached to the pryrridinium ring in the 3-position.
Preferably, A is phenyl or indanyl A particularly preferred compound of Formula (1) or a salt thereof is of Formula (3) or a salt thereof:

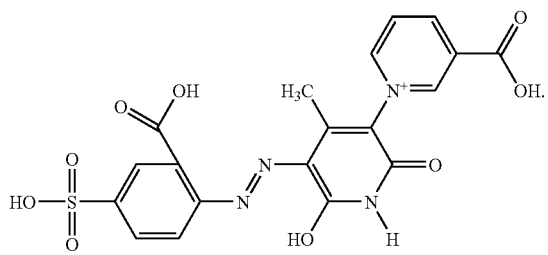

Formula (3)

The compound of Formula (3) has a particularly bright yellow colour and high chroma, it also exhibits especially good light-fastness.

In one embodiment the compound of Formula (1) or a salt thereof is of Formula (1c) or a salt thereof:

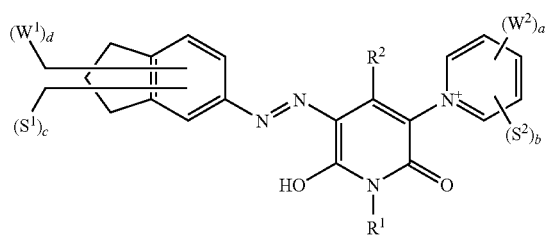

Formula (1c)

wherein:
$W^1$, $W^2$, $S^1$, $S^2$, $R^1$ and $R^2$ a, b, c and d are as hereinbefore defined.

Preferably, d is from 1 to 3, c is from 0 to 3 and (c+d) is from 1 to 3. In this embodiment all the groups represented by each $W^1$ and each $S^1$ are preferably attached to the benzyl ring present in the compound of Formula (1c).

Preferably each $S^1$ independently is $C_{1-6}$-alkyl or $C_{1-6}$-alkoxy each of which is optionally substituted by —OH.

In Formula (1c) c is preferably 0. Preferably d is 1 or 2. It is especially preferred in Formula (1c) that c is 0, a is 1 or 2 and at least one $W^1$ is ortho relative to the azo group in Formula (1c).

The compound of Formula (1) or a salt thereof may be prepared by the synthetic methods as described in U.S. Pat. No. 6,488,752 at column 5.

The compound of Formula (3) or a salt thereof may be prepared by the method described in U.S. Pat. No. 6,488,752, Example 1, beginning at column 10.

The compound of Formula (2) or a salt thereof preferably contains only two azo groups.

Preferably, one or both of the naphthyl groups present in the compound of Formula (2) or a salt thereof are attached to the relevant azo group present in the compound of Formula (2) in the 2-napthyl position.

Accordingly, a preferred compound of Formula (2) or a salt thereof is of Formula (2a) or a salt thereof:

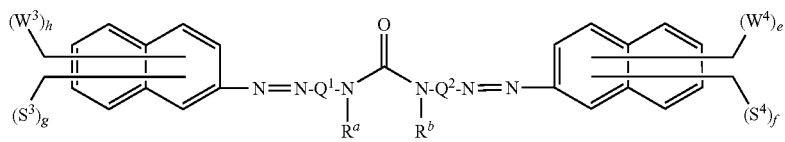

Formula (2a)

wherein $Q^1$, $Q^2$, $W^3$, $W^4$, $S^3$, $S^4$, $R^a$, $R^b$ e, f, g and h are as hereinbefore defined.

$Q^1$ is preferably a phenylene group which is para connected to the —N=N— group and the —$NR^a$— group present in the compound of Formula (2).

Similarly, $Q^2$ is preferably a phenylene group which is para connected to the —N=N— group and the —$NR^b$— group present in the compound of Formula (2).

$Q^1$ and $Q^2$ may optionally be substituted with from 1 to 4 groups (more preferably 1 or 2 groups) each independently selected from any of those as defined above for $W^1$ and $S^1$.

Preferably, $Q^1$ and $Q^2$ do not contain any —$CO_2H$, —$SO_3H$ and —$PO_3H_2$ groups.

Preferably, $Q^1$ and $Q^2$ are each independently substituted with 1 or 2 groups selected from $O_{1-6}$ alkyl, $C_{1-6}$ alkoxy, —C(O)O$C_{1-6}$ alkyl and —C(O)NH$C_{1-6}$ alkyl groups.

Preferably, $Q^1$ and $Q^2$ are substituted with at least one $C_{1-6}$ alkyl, more preferably at least one methyl group. Preferably, a $C_{1-6}$ alkyl group is present in $Q^1$ and $Q^2$ in a position which is ortho relative to the relevant azo (—N=N—) group in the compound of Formula (2).

Preferably, $Q^1$ is of the Formula (2b):

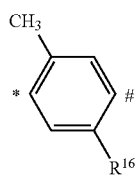

Formula (2b)

wherein
$R^{16}$ is H or methyl;
the asterisk (*) symbol represents the point of attachment to the azo group and the hash (#) symbol represents the point of attachment to the —$NR^a$— group present in the compound of Formula (2).

Similarly, $Q^2$ is preferably of Formula (2c):

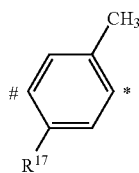

Formula (2c)

wherein
$R^{17}$ is H or methyl;
the asterisk (*) symbol represents the point of attachment to the azo group and the hash (#) symbol represents the point of attachment to the —$NR^b$— group present in the compound of Formula (2).

$R^a$ and $R^b$ may each independently be any of the groups as hereinbefore defined for $R^1$.

Preferably, $R^a$ and $R^b$ are each independently H or $C_{1-6}$ alkyl optionally substituted with from one to three (especially just one) —$CO_2H$, —OH or $SO_3H$ groups.

Preferably, $R^a$ and $R^b$ are H.

Preferably, h is 1, 2 or 3, more preferably 2.

Preferably, e is 1, 2 or 3, more preferably 2.

Preferably, both h and e are 2.

When $W^3$ or $W^4$ is an alkyl group substituted with one or more groups selected from —$CO_2H$, —$SO_3H$ and —$PO_3H_2$, the alkyl group is preferably a $C_{1-6}$ alkyl group Preferably, $W^3$ and $W^4$ are each independently —$CO_2H$, —$PO_3H_2$ or —$SO_3H$, more preferably, $W^3$ and $W^4$ are —$SO_3H$.

Preferably, one or both of the naphthyl groups present in the compound of Formula (2) or a salt thereof are of Formula (2d):

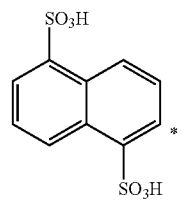

Formula (2d)

wherein the asterisk (*) represents the point of attachment to the relevant azo groups in the compound of Formula (2).

Preferably, f is 0, 1 or 2, more preferably 0.

Preferably, g is 0, 1 or 2, more preferably 0.

Preferably, f and g are both 0.

$S^3$ and $S^4$ may each independently be any of the groups as previously described for $S^1$.

In a preferred compound of Formula (2) or a salt thereof:
each $W_1$ and $W_2$ independently is —$CO_2H$, —$PO_3H_2$ or —$SO_3H$;
each $S_3$ and $S_4$ independently is $C_{1-4}$ alkyl or $C_{1-4}$ alkoxy;
e and h each independently is 1, 2 or 3;
f and g each independently is 0, 1 or 2.

Most preferably the compound of Formula (2) or a salt thereof is of Formula (4) or a salt thereof:

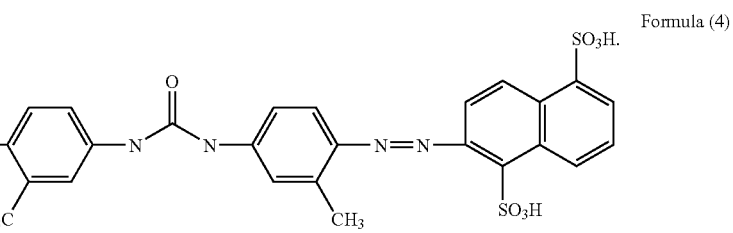

Formula (4)

The compound of Formula (4) is commercially available as C.I. Direct Yellow 50.

The compound of Formula (2) or a salt thereof may be prepared by well established diazotisation chemistry.

In a preferred synthetic route a substituted amino naphthylene is diazotized and coupled to an optionally substituted aniline compound. The product of this diazotisation reaction is preferably coupled together using phosgene ($COCl_2$).

In the present invention the compounds of Formula (1) and Formula (2) may be in the form of the free acid (i.e. the protonated form) or in the form of a salt or a mixture thereof. Accordingly, any acidic groups such as —$CO_2H$, —$SO_3H$ and —$PO_3H_2$ present in the compounds of Formula (1) or (2) may be in the form of the free acid or a salt or a mixture thereof.

Preferably, the compounds of Formula (1) and Formula (2) are in the form of a salt.

Preferred salts are alkali metal salts, ammonium and substituted ammonium salts.

Preferred metal salts are the alkali metal salts, preferably lithium, sodium, potassium salts and especially sodium salts.

Preferred ammonium and substituted ammonium salts are ammonia, organic amines and quaternary organic amines (e.g. $(CH_3)_4N^+$). The organic amines may be substituted with for example hydroxy groups (e.g. alkanolamines).

Preferably, the compound of Formula (1) or a salt thereof and of Formula (2) or a salt thereof are each independently in the form of a salt selected from the group consisting of metal, ammonium and substituted ammonium salts or a mixture thereof.

Preferably, the compounds of Formulae (1) and (2) are both in the form of the same salt.

The compounds of Formulae (1) and (2) in the form of the free acid may be converted into salts using known techniques. For example, the compound of Formula (1) in the form of the free acid may be neutralised with base such as an alkali metal hydroxide or an amine. Normally such neutralisation is performed in an aqueous liquid medium.

The salt form can be exchanged by known techniques. For example, a compound of Formula (1) or (2) in the form of an alkali metal salt can be converted into an ammonium salt by ultrafiltration with an ammonia solution or by means of an ammonium ion-exchange resin.

Preferably, both of the compounds of Formulae (1) and (2) or salts thereof are soluble in water. More preferably, both compounds are soluble in water at a concentration of at least 5% by weight of the compound.

Preferably, both of the compounds of Formulae (1) and (2) or salts thereof are yellow, orange or brown in colour. More preferably, both compounds are yellow in colour when at a concentration of 5% by weight in water.

In a preferred composition, the compound of Formula (1) or a salt thereof and/or the compound of Formula (2) or a salt thereof are purified by dialysis, reverse osmosis, ultrafiltration, ion exchange or a combination thereof. This purification may be before and/or after the preparation of said composition.

The compound of Formula (1) or a salt thereof and the compound of Formula (2) or a salt thereof may exist in tautomeric forms other than those shown in this specification. These tautomers are included within the scope of the present invention and its claims.

In a preferred embodiment the compound of Formula (1) or a salt thereof is of Formula (3) or a salt thereof and the compound of Formula (2) or a salt thereof is of Formula (4) or a salt thereof.

The compound of Formula (4) and salts thereof are known as C.I. Direct Yellow 50.

Whilst the composition according to the first aspect of the present invention may comprise a compound of Formula (1) or salt thereof and a compound of Formula (2) or a salt thereof in any proportions relative to each other we have found that certain weight ratios offer even more desirable hue, ozone-fastness and light-fastness.

Preferably, the weight ratio of the compound of Formula (1) or a salt thereof to the compound of Formula (2) or a salt thereof is from 5:95 to 95:5, more preferably from 50:50 to 95:5 and especially from 70:30 to 90:10. Among other things, these ratios provide an excellent yellow shade for the yellow ink of a trichomatic (cyan, magenta and yellow) printing ink set.

The compositions according to the first aspect of the present invention may be prepared by simply adding a compound of Formula (1) or a salt thereof to a compound of Formula (2) or a salt thereof. More preferably, the two compounds are mixed so as to form a homogenous mixture. The mixing may be by dry blending using for example, a shaker mixer, roller mixer, tumbler mixer or the like. More preferably, mixing of the compound of Formula (1) or a salt thereof and the compound of Formula (2) or a salt thereof is achieved by wet blending (i.e. mixing the compounds together with a liquid). Preferably, the liquid is or comprises water. It is especially preferable that both the compound of Formula (1) and (2) are dissolved into a liquid medium, especially an aqueous liquid medium.

According to a second aspect of the present invention there is provided an ink comprising a composition according to the first aspect of the present invention and a medium.

In a preferred embodiment the ink comprises:
(a) from 0.01 to 30 parts of a composition according to the first aspect of the present invention; and
(b) from 70 to 99.99 parts of a medium;

wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

The medium may be a low melting point solid but is preferably a liquid medium (preferably a liquid at 25° C.).

Preferably component (a) is completely dissolved in component (b). Preferably component (a) has a solubility in component (b) at 20° C. of at least 5%, more preferably at least 10% by weight. This allows the preparation of stable inks and concentrates which may be used to prepare more dilute inks and reduces the chance of the dye precipitating if evaporation of the liquid medium occurs during storage.

In one embodiment the liquid medium is or comprises water (i.e. the ink is aqueous).

Preferred liquid media include water, a mixture of water and an organic solvent and an organic solvent free from water.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Examples of further suitable ink media comprising a mixture of water and one or more organic solvents are described in U.S. Pat. Nos. 4,963,189, 4,703,113, 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include ketones and alcohols (especially methyl ethyl ketone and $C_{1-4}$ alkanols). In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

When the liquid medium is an organic solvent free from water the compounds of Formula (1) and (2) are preferably in the form of a salt with a lipophilic amine. Preferred lipophilic amines contain at least one $C_{4-20}$ alkyl group, more preferably at least one $C_{6-20}$ alkyl group.

Inks in which component (b) is an organic solvent free from water are particularly useful where fast drying times are required and particularly when printing onto hydrophobic and/or non-absorbent substrates, for example plastics, metal and glass.

Preferably, the low melting point solid is solid at 25° C. and melts at a temperature above 50° C. More preferably, the low melting point solid has a melting point in the range from 60° C. to 125° C.

Suitable media which melt in this temperature range include long chain fatty acids, long chain sulfonamides or long chain alcohols, preferably those having $C_{18-24}$ chains. The compound of Formula (1) or a salt thereof and the compound of Formula (2) or a salt thereof may be dissolved in the low melting point solid or they may be finely dispersed in it.

Inks according to the second aspect of the present invention may be prepared by adding together a compound of Formula (1) or a salt thereof, a compound of Formula (2) or a salt thereof and a medium.

Preferably, the medium is a liquid medium. When the liquid medium is or comprises water, it is preferred that the water used to prepare the ink has a relatively low conductivity.

Preferably, the water used to prepare the ink has a conductivity of less than 50 µS/cm, more preferably less than 10 µS/cm and especially less than 2 µS/cm. Water having these conductivity values can be prepared by known methods such as deionization, reverse osmosis and distillation.

Preferably, the above components used to prepare the ink are mixed together so as to fully dissolve the compounds and to homogenize the ink.

The inks according to the second aspect of the present invention may also contain additional components suitable for use in ink jet printing inks. Inks may contain for example viscosity and surface tension modifiers, corrosion inhibitors, biocides, kogation reducing additives and surfactants.

Preferably, the ink has been filtered through a filter having a mean pore size of less than 10 µm, more preferably less than 5 µm, especially less than 2 µm, more especially less than 1 µm. In this way particulate matter is removed which could otherwise block the fine nozzles used in ink jet printers.

Preferably, the ink has a viscosity of less than 50 mPa·s, more preferably less than 20 mPa·s, especially less than 10 mPa·s at a temperature of 25° C.

Preferably, the ink has a concentration of halide ions of less than 500 parts per million and more preferably less than 100 parts per million. It is especially preferred that the ink has less than 100, more preferably less than 50 parts per million in total of divalent and trivalent metals. Parts per million refer to parts by weight of the relevant ions or metals relative to the total weight of the ink. Any suitable means to remove halide ions and/or di and trivalent metals may be employed, e.g. ion exchange and ultra-filtration.

Preferably, the ink is aqueous and has a conductivity of less than 50 µS/cm. Preferably, the conductivity of the ink is measured at a temperature of 25° C. Low conductivities are preferably achieved by, for example, dialysis, ion exchange or ultra-filtration.

Preferably, the ink is yellow, more preferably the ink is yellow in colour when the total amount of the compound of Formula (1) or a salt thereof and the compound of Formula (2) or a salt thereof is 5% by weight relative to the ink.

According to a third aspect of the present invention there is provided a process for printing an image on a substrate comprising applying thereto an ink according to the second aspect of the present invention.

Preferably, the printing is performed by means of an ink jet printer.

The image may be in the form of a picture, text, graph, photograph or the like without any particular limitation.

According to a fourth aspect of the present invention there is provided an ink jet printer cartridge comprising a chamber and an ink, wherein the ink is present in the chamber and the ink is according to the second aspect of the present invention.

According to a fifth aspect of the present invention there is provided a substrate printed with an ink according to the second aspect of the present invention.

Preferred substrates include paper, transparent plastic or textile materials.

Preferred substrates are those having a receptor layer for the ink. The receptor layer may be porous or non-porous.

According to a sixth aspect of the present invention there is provided the use of a composition according to the first aspect of the present invention for preparing an ink jet printing ink comprising water and said composition, wherein the ink has a conductivity of less than 50 µS/cm.

In the description of the present invention the words "a" or "an" are frequently used to mean one or more where such meaning is appropriate and unless otherwise stated. Thus for example, "a compound of Formula (1) or a salt thereof" means one or more compound of Formula (1) or salts thereof. For example, the composition according to the first aspect of the present invention might comprise a compound of Formula (1) in the form of the free acid and the compound of Formula (1) in the form of a salt in combination with a compound of Formula (2) in the form of a salt. Similarly, a substrate means one or more substrates, a chamber means one or more chambers and an image means one or more images.

The invention is further illustrated by the following Examples in which all parts, percentages and ratios are by weight unless otherwise stated.

EXAMPLE 1

Dye (1)

Dye (1) was prepared and purified according to U.S. Pat. No. 6,488,752, column 10, line 1 to column 11, line 14. Dye (1) was compound of Formula (3), namely:

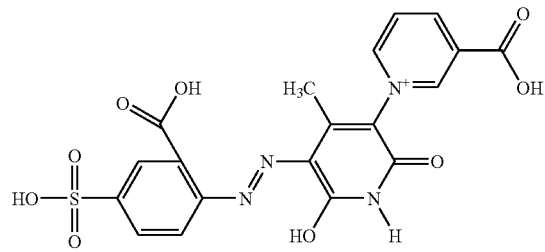

in the form of the sodium salt.

Dye (2)

Dye (2) was obtained from Abbey Color Inc under the tradename ABCOL™ Direct Yellow RLSW. Dye (2) was a compound of Formula (4), namely:

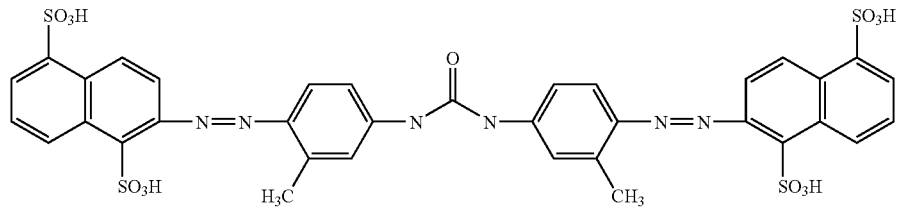

in the form of the sodium salt.

Compositions according to the present invention may be prepared by dissolving Dye (1) in the amounts indicated in Table 1, column 1 and Dye (2) in the amounts indicated in Table 1, column 2 in sufficient deionized water to make the total composition up to 100 parts by weight.

TABLE 1

| Dye (1) parts | Dye (2) parts | Ratio of amount Dye (1):Dye (2) |
|---|---|---|
| 2 | 2 | 1:1 |
| 2 | 1 | 2:1 |

TABLE 1-continued

| Dye (1) parts | Dye (2) parts | Ratio of amount Dye (1):Dye (2) |
|---|---|---|
| 3.66 | 1 | 3.66:1 |
| 4 | 1 | 4:1 |
| 2 | 0.4 | 5:1 |
| 2 | 0.2 | 10:1 |

Ink Jet Printing Inks

The compositions described in Table 1 may be used to prepare ink jet printing inks by adding one or more suitable additives. In particular, ink jet printing inks may be prepared containing 2-pyrrolidone (5 parts), thiodiglycol (5 parts), Surfynol™ 465 (1 part from Air products) the amounts of Dyes (1) and (2) as indicated in Table 1 and deionized water so as to make the total up to 100 parts.

EXAMPLE 2

Further Inks

The further inks described in Tables I and II may be prepared wherein the first column indicates the amount of Dye (1) in parts, the second column indicates the amount of Dye (2) in parts and the third column indicates the ratio of the amounts of Dye (1) to Dye (2). All of the further inks in Tables I and II are made up to 100 parts with deionized water. The numbers quoted in the fourth column onwards refer to the number of parts of the relevant ingredient and all parts and ratios are by weight. The further inks may be applied to paper by thermal or piezo ink jet printing.

The following abbreviations are used in Tables I and II:
PG=propylene glycol
DEG=diethylene glycol
NMP=N-methyl pyrollidone
DMK=dimethylketone
IPA=isopropanol
MeOH=methanol
2P=2-pyrollidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=urea

TABLE I

| Dye (1) | Dye (2) | Ratio of Dye (1):Dye (2) | PG | DEG | NMP | DMK | NaOH | Na Stearate | IPA | MEOH | 2P | MIBK |
|---|---|---|---|---|---|---|---|---|---|---|---|---|
| 5 | 0.5 | 10:1 | 5 | | 6 | 4 | | | | | 5 | |
| 4 | 0.5 | 8:1 | | 5 | 5 | | 0.2 | | | | | |
| 3 | 1 | 3:1 | 3 | | 3 | 3 | | | | 5 | 1 | |
| 2 | 2 | 1:1 | | 8 | | | | | | | | 1 |
| 6 | 3 | 2:1 | 5 | | | | | 0.2 | 4 | | | 5 |
| 4 | 1 | 4:1 | | | 9 | | 0.5 | 0.5 | | 9 | | |
| 4.7 | 1.3 | 3.6:1 | 4 | 15 | 3 | 3 | | | 6 | 10 | 5 | 4 |
| 3.7 | 2.3 | 1.6:1 | | 20 | | | | | 10 | | | |
| 4.2 | 1.8 | 2.3:1 | 5 | 4 | | 5 | | | | 6 | | 5 |
| 4 | 2 | 2:1 | 3 | 5 | 2 | 10 | | 0.3 | | | | |
| 3 | 3 | 1:1 | | 5 | 4 | 6 | | | 5 | 4 | 6 | 5 |
| 2 | 0.5 | 4:1 | | | | | | | | 4 | | |
| 1.67 | 0.83 | 2:1 | 5 | | | | | | 5 | | | |
| 1.87 | 0.63 | 3:1 | 2 | 6 | 2 | 5 | | | 1 | | 4 | |
| 2.08 | 0.42 | 5:1 | | 5 | | | | | | | 15 | |
| 2.25 | 0.25 | 9:1 | | | 11 | | | | | | 5 | |
| 2.3 | 0.2 | 11.5:1 | 2 | | | 10 | | | | 2 | | 6 |
| 1.25 | 1.25 | 1:1 | | | | 7 | 0.3 | | 3 | | | |
| 2 | 0.5 | 4:1 | 2 | 20 | 2 | 1 | | | | | 3 | 3 |
| 2.08 | 0.42 | 5:1 | | | 4 | | | | | | 5 | |

TABLE II

| Dye (1) | Dye (2) | Ratio of Dye (1):Dye (2) | PG | DEG | NMP | CET | TBT | TDG | BDL | PHO | 2P | PI2 |
|---|---|---|---|---|---|---|---|---|---|---|---|---|
| 5 | 0.5 | 10:1 | 15 | | | 0.2 | | | | | 5 | |
| 4 | 0.5 | 8:1 | | 5 | | | | | | 1.2 | | 5 |
| 3 | 1 | 3:1 | 5 | 5 | | 0.15 | 5.0 | 0.2 | | | | |
| 2 | 2 | 1:1 | | 6 | 4 | | | | | 0.12 | | |
| 6 | 3 | 2:1 | 4 | 8 | | 0.3 | | | | | | 6 |
| 4 | 1 | 4:1 | | 10 | | | | | 5 | 0.2 | | |
| 4.7 | 1.3 | 3.6:1 | | 5 | 5 | | | 0.3 | | | | |
| 3.7 | 2.3 | 1.6:1 | | 10 | 4 | | | | 1 | | 4 | 11 |
| 4.2 | 1.8 | 2.3:1 | 4 | 10 | 3 | | | | 2 | 6 | | |
| 4 | 2 | 2:1 | | | 6 | | | | | 3 | | |
| 3 | 3 | 1:1 | | 9 | 7 | | 3.0 | | | 0.95 | 5 | |
| 2 | 0.5 | 4:1 | 5 | 11 | | | | | | | 6 | |
| 1.67 | 0.83 | 2:1 | | | 7 | | | | | | 7 | |
| 1.87 | 0.63 | 3:1 | 5 | 5 | 5 | 0.1 | 0.2 | 0.1 | 5 | 0.1 | 5 | |
| 2.08 | 0.42 | 5:1 | | 10 | | | | | | | | |
| 2.25 | 0.25 | 9:1 | | | | | | 10 | | | | |
| 2.3 | 0.2 | 11.5:1 | | | 5 | | | 12 | | | 5 | |
| 1.25 | 1.25 | 1:1 | 2 | | 8 | | | 15 | | | 5 | |
| 2 | 0.5 | 4:1 | | | | | | 8 | | | 12 | |
| 2.08 | 0.42 | 5:1 | | 10 | | | | | | | | |

The invention claimed is:

1. A composition comprising a compound of Formula (1) or a salt thereof and compound of Formula (2) or a salt thereof:

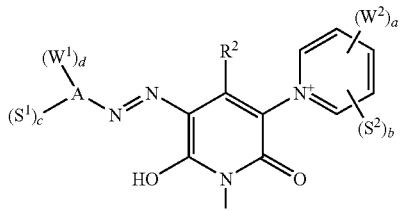

Formula (1)

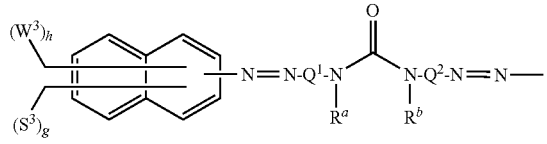

Formula (2)

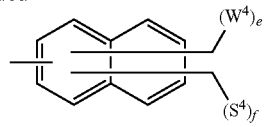

-continued wherein:
A is an aryl or heteroaryl group;
$Q^1$ and $Q^2$ each independently is an optionally substituted phenylene group;
$R^1$, $R^2$, $R^a$ and $R^b$ each independently is H, optionally substituted alkyl, optionally substituted aryl or optionally substituted arylalkyl;
each $W^1$, $W^2$, $W^3$ and $W^4$ independently is a —$CO_2H$, —$SO_3H$, —$PO_3H_2$ group or an alky substituted with one or more groups selected from the group consisting of —$CO_2H$, —$SO_3H$, and —$PO_3H_2$;

each $S^1$, $S^2$, $S^3$ and $S^4$ independently is a substituent other than those defined for $W^1$, $W^2$, $W^3$ and $W^4$;
a and d each independently is from 1 to 5;
b and c each independently is from 0 to 4;
(a+b) has a value of from 1 to 5;
(c+d) has a value of from 1 to 5;
e and h each independently is from 1 to 7;
f and g each independently is from 0 to 6;
(e+f) has a value of from 1 to 7; and
(g+h) has a value of from 1 to 7.

2. A composition according to claim 1 wherein in the compound of Formula (1) or a salt thereof:
each $W^1$ and $W^2$ independently is —$CO_2H$, —$SO_3H$ or a $C_{1-6}$ alkyl substituted by —$CO_2H$ or —$SO_3H$;
each $S^1$ and $S^2$ independently is $C_{1-6}$ alkyl, phenyl, nitro, halo, cyano, —$CF_3$, —$NH_2$, $C_{1-6}$ alkoxy, —$SC_{1-6}$ alkyl, —$C_{1-6}$ alkyl substituted by —OH or —$NHC(O)C_{1-6}$ alkyl;
$R^1$ is H or $C_{1-6}$-alkyl optionally substituted by —OH, —$SO_3H$ or —$CO_2H$;
$R^2$ is $C_{1-4}$ alkyl;
a and d each independently is 1 or 2;
b and c each independently is 0, 1 or 2; and
in the compound of Formula (2) or a salt thereof:
each $W_1$ and $W_2$ independently is —$CO_2H$, —$PO_3H_2$ or —$SO_3H$;
each $S_3$ and $S_4$ independently is $C_{1-4}$ alkyl or $C_{1-4}$ alkoxy;
e and h each independently is 1, 2 or 3;
f and g each independently is 0, 1 or 2.

3. A composition according to claim 1 wherein the compound of Formula (1) or a salt thereof is of Formula (3) or a salt thereof and the compound of Formula (2) or a salt thereof is of Formula (4) or a salt thereof:

compound of Formula (2) or a salt thereof is from 70:30 to 90:10.

6. A composition according to claim 1 wherein the compound of Formula (1) or a salt thereof and of Formula (2) or a salt thereof is in the form of a salt selected from the group consisting of metal, ammonium and substituted ammonium salts or a mixture thereof.

7. A composition according to claim 1 wherein the compound of Formula (1) or a salt thereof and/or a compound of Formula (2) or a salt thereof are purified by dialysis, reverse osmosis, ultrafiltration, ion exchange or a combination thereof, before and/or after preparation of said composition.

8. An ink comprising a composition according to claim 1 and a medium.

9. An ink according to claim 8 comprising:
(a) from 0.01 to 30 parts of the composition according to any one of claims 1 to 8; and
(b) from 70 to 99.99 parts of a medium;
wherein all parts are by weight and the sum of the parts (a)+(b)=100.

10. An ink according to claim 9 wherein the medium is a liquid medium.

11. An ink according to claim 10 wherein the liquid medium is or comprises water and the water used to prepare the ink has a conductivity of less than 50 μS/cm.

12. An ink according to claim 10 having a viscosity of less than 50 mPa·s at a temperature of 25° C.

13. A process for ink jet printing an image on a substrate comprising applying thereto an ink according to claim 8.

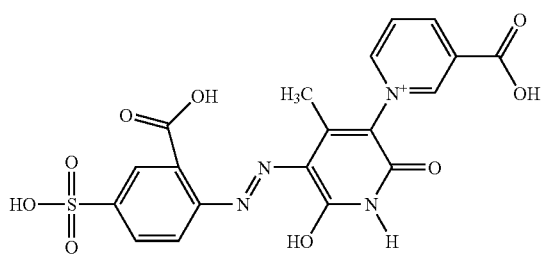

Formula (3)

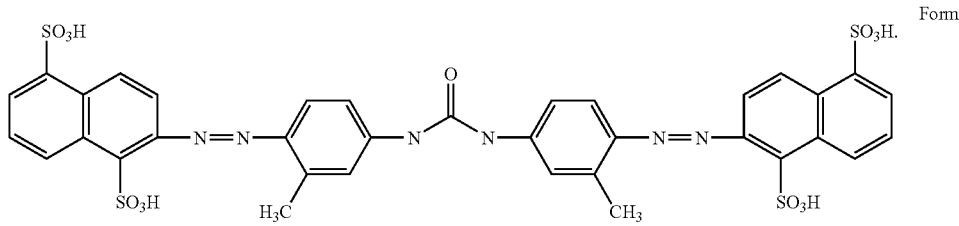

Formula (4)

4. A composition according claim 1 wherein the weight ratio of the compound of Formula (1) or a salt thereof to the compound of Formula (2) or a salt thereof is from 50:50 to 95:5.

5. A composition according to claim 1 wherein the weight ratio of the compound of Formula (1) or a salt thereof to the 14. An ink jet printer cartridge comprising a chamber and an ink, wherein the ink is present in the chamber and the ink is according to claim 8.

15. A substrate printed with an ink according to claim 8.

* * * * *